United States Patent
Hu et al.

(10) Patent No.: US 12,484,556 B2
(45) Date of Patent: Dec. 2, 2025

(54) PASSIVE HUMMINGBIRD WATER FEEDER AND FEEDING METHOD

(71) Applicant: NETVUE TECHNOLOGIES CO., LTD., Shenzhen (CN)

(72) Inventors: Youle Hu, Shenzhen (CN); Yucheng Ren, Shenzhen (CN); Rui Zhang, Shenzhen (CN); Chuan Chen, Shenzhen (CN)

(73) Assignee: NETVUE TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/788,338

(22) Filed: Jul. 30, 2024

(65) Prior Publication Data
US 2025/0268239 A1    Aug. 28, 2025

(30) Foreign Application Priority Data
Feb. 28, 2024 (CN) .......................... 202410222791.6

(51) Int. Cl.
*A01K 39/026* (2006.01)
*A01K 39/02* (2006.01)

(52) U.S. Cl.
CPC ........ *A01K 39/026* (2013.01); *A01K 39/0206* (2013.01)

(58) Field of Classification Search
CPC ........................... A01K 39/026; A01K 39/0206
See application file for complete search history.

(56) References Cited

U.S. PATENT DOCUMENTS

| | | | | |
|---|---|---|---|---|
| 4,441,459 A * | 4/1984 | Giordano | ............... | A01K 39/02 |
| | | | | 119/72 |
| 5,740,759 A * | 4/1998 | Cummings | ........ | A01K 39/0206 |
| | | | | 215/11.1 |
| 6,792,891 B1 * | 9/2004 | Coburn | ............. | A01K 39/0206 |
| | | | | 119/72 |
| 8,051,803 B2 * | 11/2011 | Gauker | .................. | A01K 39/04 |
| | | | | 119/81 |
| 8,333,168 B2 * | 12/2012 | Vaughn, Jr. | .......... | A01K 39/026 |
| | | | | 119/72 |
| 8,869,743 B2 * | 10/2014 | Cruz | ...................... | A01K 39/04 |
| | | | | 119/80 |
| 9,179,650 B2 * | 11/2015 | Gauker | .................. | A01K 39/02 |
| 9,351,479 B2 * | 5/2016 | Chen | ................... | A01K 39/0206 |
| 2004/0118354 A1 * | 6/2004 | Cox | .................... | A01K 39/0213 |
| | | | | 119/72 |
| 2007/0272161 A1 * | 11/2007 | Stone | ................. | A01K 39/0206 |
| | | | | 119/51.01 |
| 2008/0314327 A1 * | 12/2008 | Hepp | ..................... | A01K 39/02 |
| | | | | 119/74 |

(Continued)

FOREIGN PATENT DOCUMENTS

WO    WO-2020087112 A1 *    5/2020    ............... A01K 7/02

*Primary Examiner* — Peter M Poon
*Assistant Examiner* — Hae Rie Jessica Byun

(57) ABSTRACT

A passive hummingbird water feeder and a feeding method thereof. By setting up an air cavity pipe, a delivery pipe, and a water storage bladder, and based on the siphon principle, water is introduced from the container into the water storage bladder without power with water level maintained, allowing water filling directly from above the container. The design simulates the foraging habits of hummingbirds, and enables photographing of flowers and birds.

10 Claims, 6 Drawing Sheets

(56) References Cited

U.S. PATENT DOCUMENTS

| | | | |
|---|---|---|---|
| 2009/0188434 A1* | 7/2009 | McMullen | A01K 39/04 119/72 |
| 2009/0199777 A1* | 8/2009 | Webber | A01K 39/04 119/74 |
| 2010/0224132 A1* | 9/2010 | Gauker | A01K 39/02 119/80 |
| 2011/0011345 A1* | 1/2011 | LoRocco | A01K 39/02 119/72 |
| 2016/0007574 A1* | 1/2016 | Lipford | G06Q 30/0603 119/72 |
| 2016/0106072 A1* | 4/2016 | Bennett | A01K 39/0206 119/51.02 |
| 2016/0128308 A1* | 5/2016 | Lipford | A01K 39/02 119/72 |

* cited by examiner

In storing water, the connecting pipe 3 connects with the container 1 and the water storage bladder 4 to store sugar water; and the container 1 and the water storage bladder 4 form a siphon to maintain the water level in the water storage bladder 4 unchanged

In accessing water, the hummingbird hits open the water storage bladder 4 to suck the sugar water; and under the siphon action, the sugar water is introduced into the water storage bladder 4 from the container 1 through the connecting pipe 3, so that the water level of the water storage bladder 4 remains unchanged and the supply of sugar water is guaranteed

When replenishing sugar water into the container 1, the upper part of the container 1 is opened for filling; after replenishing, add the sealing cover plate 2 and the connecting pipe 3, the air hole 11 closes, and the water storage bladder 4 communicates with the connecting pipe 3, and the sugar water in the container 1 is introduced into the water storage bladder4 by repeatedly squeezing the water storage bladder 4

Fig. 7

PASSIVE HUMMINGBIRD WATER FEEDER AND FEEDING METHOD

CROSS REFERENCE TO RELATED APPLICATION

This application claims priority benefit of Chinese patent Application No. 202410222791.6, filed on Feb. 28, 2024, and the entire contents of which are incorporated herein by reference.

TECHNICAL FIELD

The present invention is related to the technical field of bird water feeders. In particular, the present invention is directed to a passive hummingbird water feeder and the feeding method thereof.

BACKGROUND

People living in areas inhabited by hummingbirds attract and observe hummingbirds by using hummingbird water feeders. As hummingbirds feed on liquid nectar, hummingbird water feeders usually contain simulated nectar made of sugar and water. In many hummingbird water feeders, the sugar water is stored in containers and delivered to the simulated flowers, so that the hummingbird can suck the sugar water by inserted its elongated beak into the entry-exit holes of simulated flowers.

Most hummingbird water feeders are based on two basic designs. One comprises an inverted container that deliver contents to the lower feeding bowl, from which the birds forage; the vacuum on the top of the container prevents the liquid from draining too fast from the container, and a floating valve structure is generally used to control the entry and exit of liquids and maintain an appropriate water level. The other comprises a container with holes in the lid through which hummingbirds can suck sugar water. However, the hummingbird water feeders of prior art have the following drawbacks:

(1) water is injected from the bottom, and the bottle is inverted and well-placed after filling the water, which is troublesome;

(2) the multiple excessive structures near the water outlet of the simulated flower differ greatly from a real-life flower, making it undesirable in simulating the normal habits of hummingbirds;

(3) the lack of a proper photographing device makes it inconvenient to photograph and record the process and habit of hummingbirds sucking sugar water; and other excessive elements, other than the hummingbirds and simulated flowers, are also captured in the images;

(4) a floating valve structure is necessary to control the water level and liquid entry-exit, which requires high-standard floating valves, increasing costs and adding to maintenance work.

It is necessary develop a passive hummingbird water feeder and the feeding method thereof that realize water injection from above the water feeder, and hummingbirds sucking sugar water from simulated flowers unpowered, and that the real-life flowers can be simulated to protect the foraging habits of hummingbirds, and photographing and recording can be carried out when hummingbirds suck sugar water.

SUMMARY

Accordingly, the main object of the present invention is to provide a passive hummingbird water feeder and a feeding method thereof, so as to overcome the drawbacks of prior art that hummingbird water feeders are troublesome in filling water, bear excessive structures around simulated flowers, and lack of proper photographing devices.

The technical proposal of the present invention, wherein:
according to one aspect of the present invention, a passive hummingbird water feeder is provided, wherein:
a container, a connecting pipe and a water storage bladder is provided; one end of the connecting pipe connects to the water storage bladder, and the other end is placed inside the container, and the maximum water level of the water storage bladder is not higher than that of the container; and the water storage bladder is used as a hummingbird sucking mouth;
further, a cover plate connected to the container is provided;
further, the connecting pipe comprises an air cavity pipe and a delivery pipe; the air cavity pipe is provided with an air hole; one end of the air cavity pipe is placed inside the container, and the other end passes through the cover plate, and is sealed and fitted with the cover plate;
further, one end of the delivery pipe is located inside the container after passing through the air cavity pipe, and the other end is sealed and fitted above the air cavity pipe and protrudes and droops to communicate with the water storage bladder; and the water level of the water storage bladder is the same as the lowest water level of the container;
further, the cover plate is provided with an adjustment hole, and the opening and closing control of the air hole is realized by changing the relative positions of the air hole and the adjustment hole;
further, a sensor is provided on the container for detecting the water level of the container;
further, a photographing device is provided to recognize the hummingbird, and automatically adjust the shooting angle and shooting parameters;
no structures other than the water storage bladder and the delivery pipe of the hummingbird water feeder appear in the images captured by the photographing device;
further, it comprises a sucrose dosing device for adjust the proportion of sugar and water, and proportionate according to the hummingbird species.

According to one aspect of the present invention, a passive hummingbird water feeder is provided, and the feeding method thereof, wherein:
in storing water, the connecting pipe connects with the container and the water storage bladder to store sugar water; and the container and the water storage bladder form a siphon to maintain the water level in the water storage bladder unchanged;
in accessing water, the hummingbird hits open the water storage bladder to suck the sugar water; and under the siphon action, the sugar water is introduced into the water storage bladder from the container through the connecting pipe, so that the water level of the water storage bladder remains unchanged and the supply of sugar water is guaranteed;
further, the method thereof comprises steps, wherein: in replenishing sugar water into the container, the upper part of the container is opened for filling water; after replenishing, add the sealing cover plate and the connecting pipe, the air hole closes, and the water storage bladder communicates with the connecting pipe; and the sugar water in the container is introduced into the water storage bladder by repeatedly squeezing the water storage bladder;

further, by changing the relative positions of the air hole and the adjustment hole, the opening and closing of the air hole is controlled;

further, a sensing device is provided to detect the water level, and issue an alarm to notify the user when the water level is about to reach a set highest or lowest value.

As can be seen from the above technical proposal, the present invention has at least the following advantages and beneficial effects compared with the prior art:

(1) the present invention can replenish sugar water by opening the cover plate and directly injecting water into the container, without inverting the container after water filling;

(2) a water storage bladder is set as a simulated flower, and the water storage bladder is connected to a delivery tube instead of being installed on a feeding tray, which is closer to the state of a real-life flower, simulating hummingbirds hovering in midair foraging for nectar;

(3) a photographing device is set up properly to avoid photographing parts other than the hummingbirds and water storage bladder; cooperated with the direction change of the water storage bladder surrounding the container, and the self-rotating of the water storage bladder, the photographing angle and the proportion of birds and flowers in the images can be changed, so as to satisfy the various photographing needs of hummingbirds sucking nectar;

(4) by setting a connecting pipe composed of an air cavity pipe and a delivery pipe, based on the working principles of gas-liquid equilibrium and siphon in the container, a constant liquid level is formed by the water level of the water storage bladder and that at the gas-liquid equilibrium surface in the container, so as to realize the unpowered water supply to the water storage bladder.

BRIEF DESCRIPTION OF THE DRAWINGS

For a fuller understanding of the embodiments and the technical proposals of prior art of the present invention, the accompanying drawings are described briefly below. In all drawings, like reference numerals refer to like components or parts throughout the various views unless otherwise specified, and the elements or parts depicted in the drawings are not necessarily drawn to scale.

FIG. 7 is a flowchart of the feeding method of the passive hummingbird feeder of an embodiment of the present invention;

Markings of drawings: 1. Container; 2. Cover plate; 3. Connecting pipe; 4. Water storage bladder; 5. Air cavity pipe; 6. Delivery pipe; 7. Hollow pipe; 8. Closed plate; 9. Hollow thin pipe; 10. Adjustment hole; 11. Air hole; 12. Photographing device; 13. Flower branch; 14. Handle; 15. lower cavity; 16. sensing device; 17. one-way duckbill valve.

EMBODIMENTS

To more clearly describe the technical proposal in embodiments of the present application, below in conjunction with accompanying drawings the present application is further specified, upon which those skilled in the art can obtain other drawings without creative efforts Further, the described features, structures or characteristics may be combined in any suitable manner in one or more embodiments. In the following descriptions, many specific details are provided to give a full understanding of embodiments of the present invention. However, it will be appreciated by persons skilled in the art that the technical proposal of the present invention may be practiced without one or more of the particular details, or may be practiced with other methods, components, devices, steps, etc. In other cases, methods known in the art, devices, implementations or operations are not shown or described in detail to avoid obscuring aspects of the present invention.

The accompanying flowchart are functional entities only and may not correspond to physically independent entities, that is, these functional entities may be realized in software form, or in one or more hardware modules or integrated circuits, or in different networks and/or processor devices and/or microcontroller devices.

The accompanying flowchart is only an exemplary illustration and may not comprise all the contents and operations/steps, nor may it be performed in the order described herein. For example, some operations/steps may be broken down, and some may be merged or partially merged, so the order of action may vary according to the actual situation.

The present invention is described in detail below in connection with specific embodiments:

Embodiment 1

Figure 1:
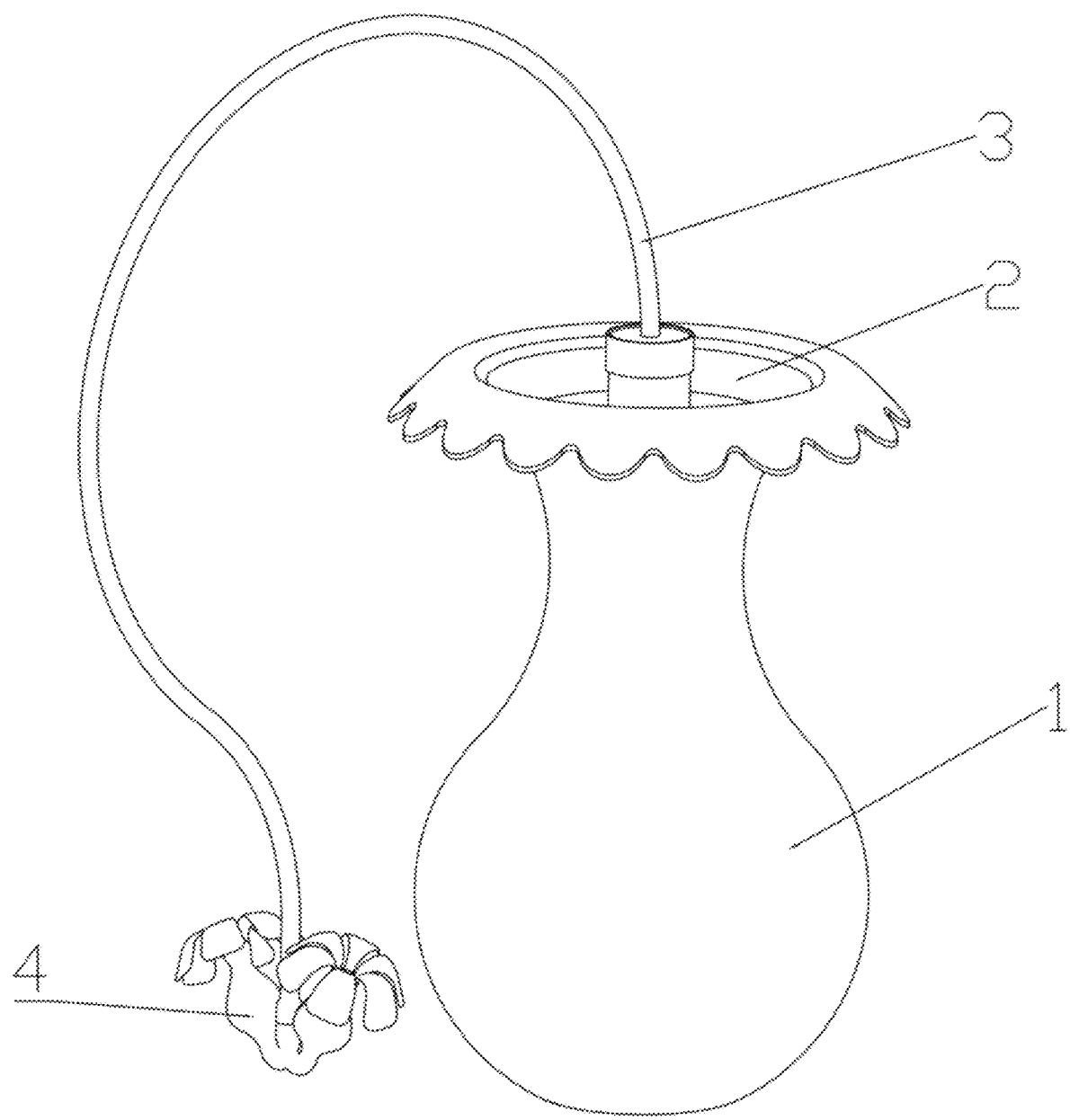
FIG. 1 is a structural view of the passive hummingbird feeder of an embodiment of the present invention.
Figure 2:
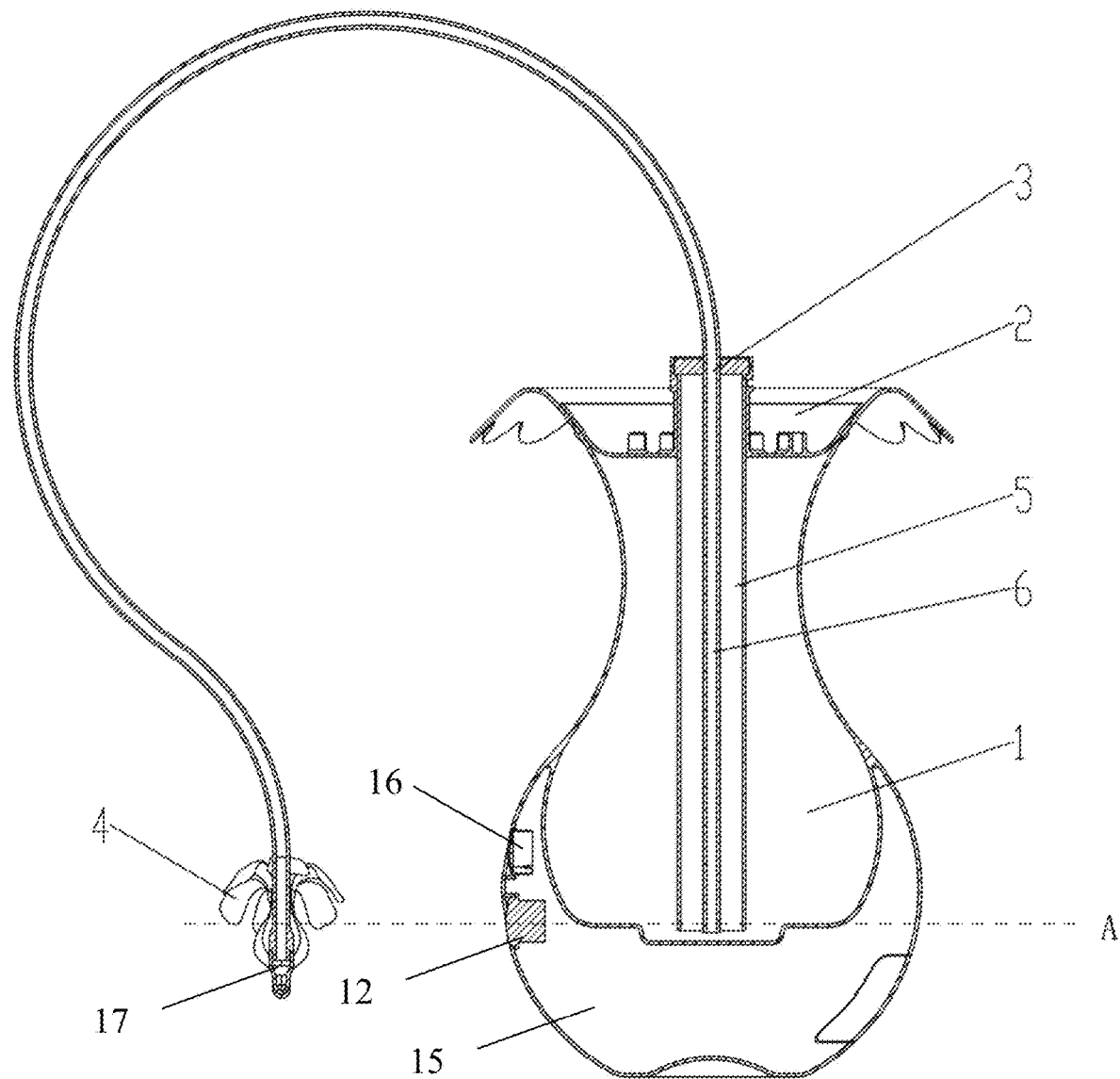
FIG. 2 is a cross-sectional view of the passive hummingbird feeder of an embodiment of the present invention.
Figure 3:
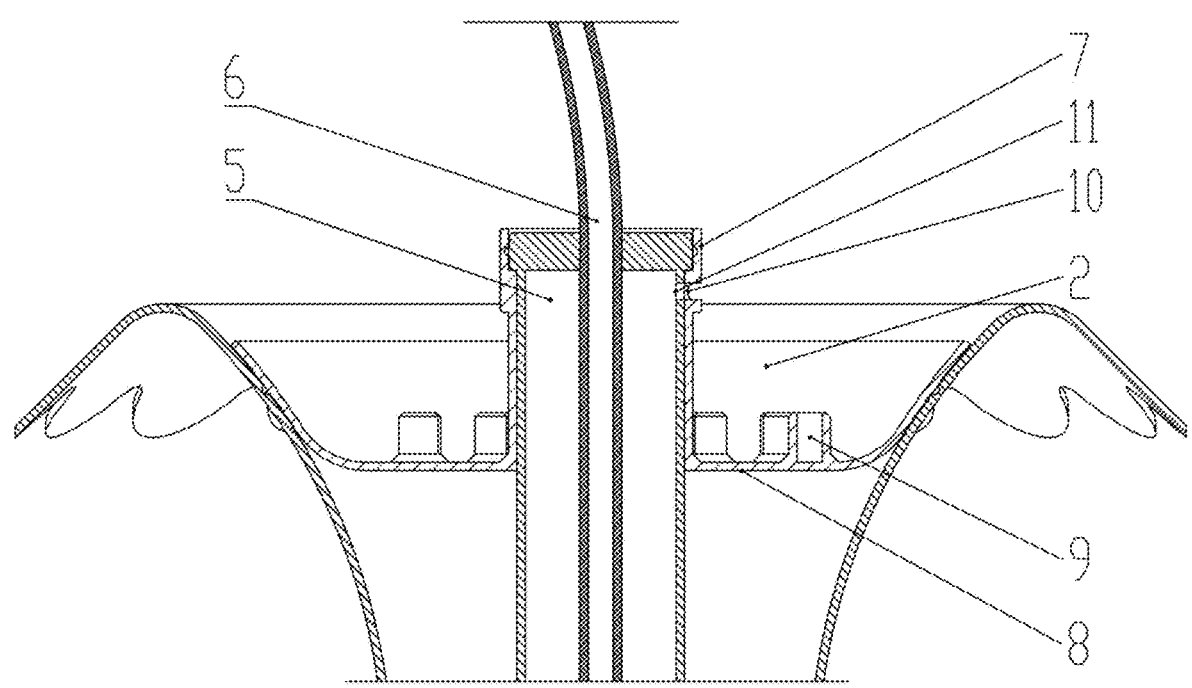
FIG. 3 is an enlarged cross-sectional view of the cover plate of an embodiment of the present invention.
Figure 4:
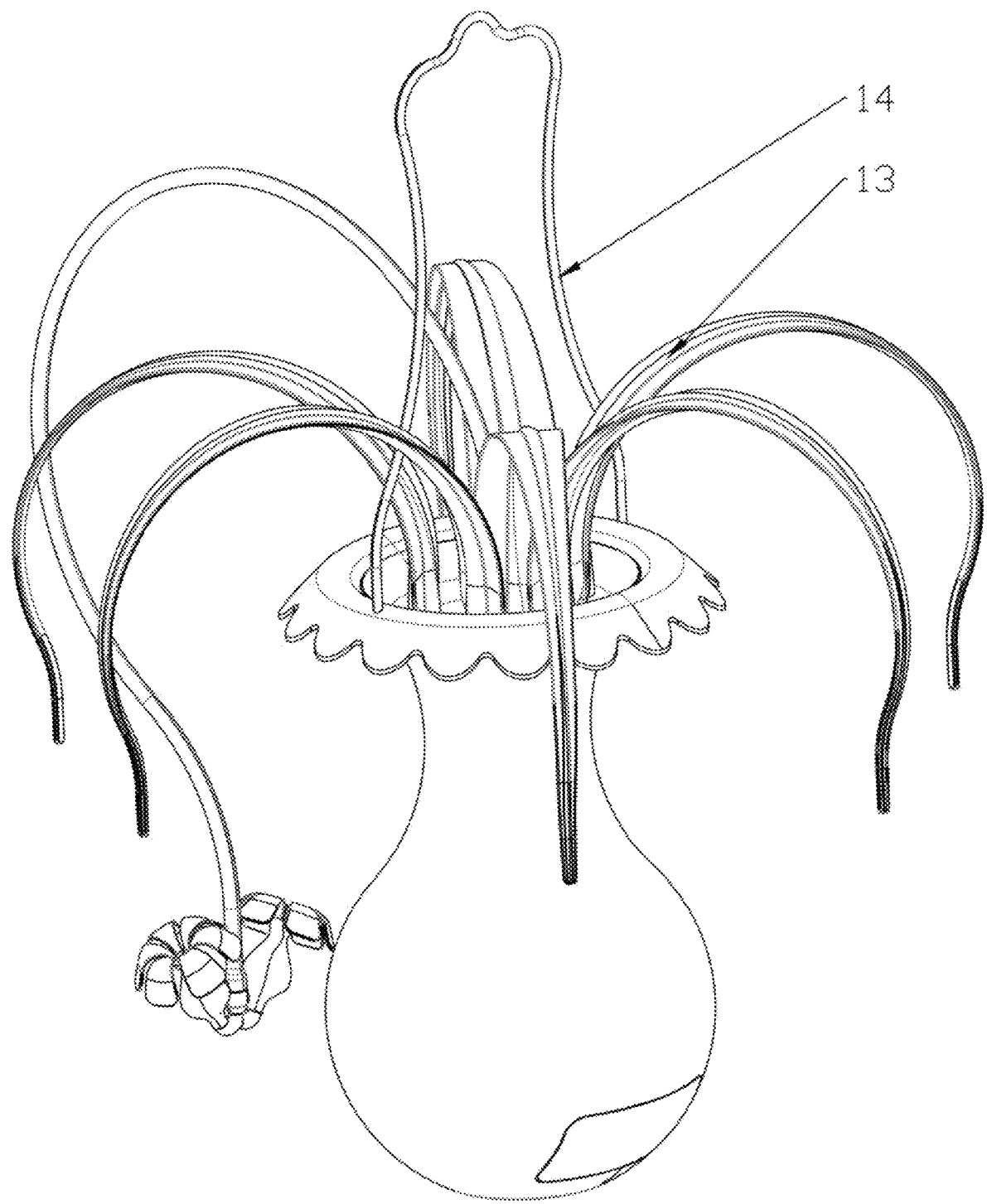
FIG. 4 is a decorative effect diagram of the passive hummingbird feeder of an embodiment of the present invention.
Figure 5:
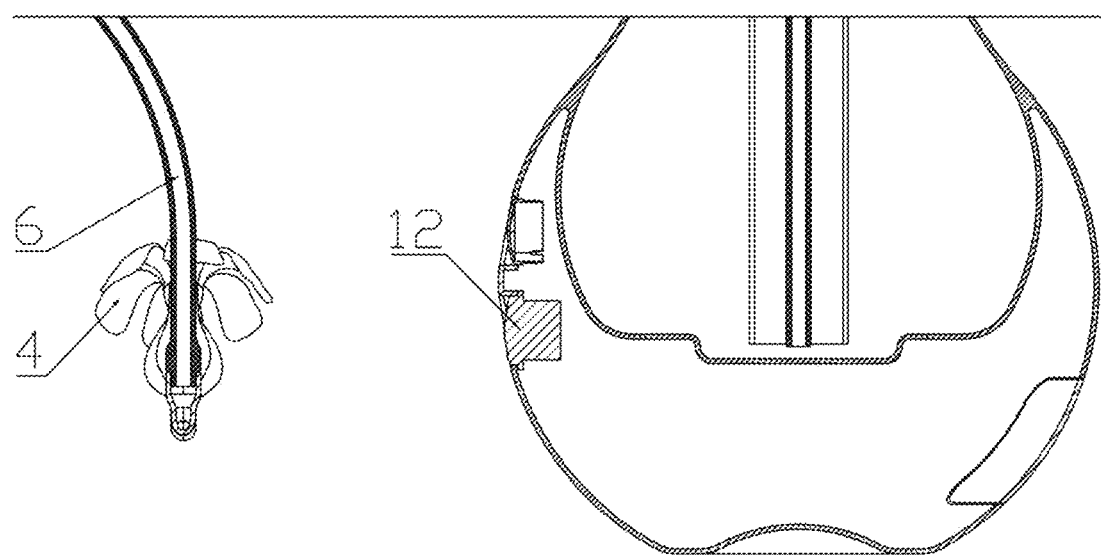
FIG. 5 is a cross-sectional view of the installation of the photographing device of an embodiment of the present invention.
Figure 6:
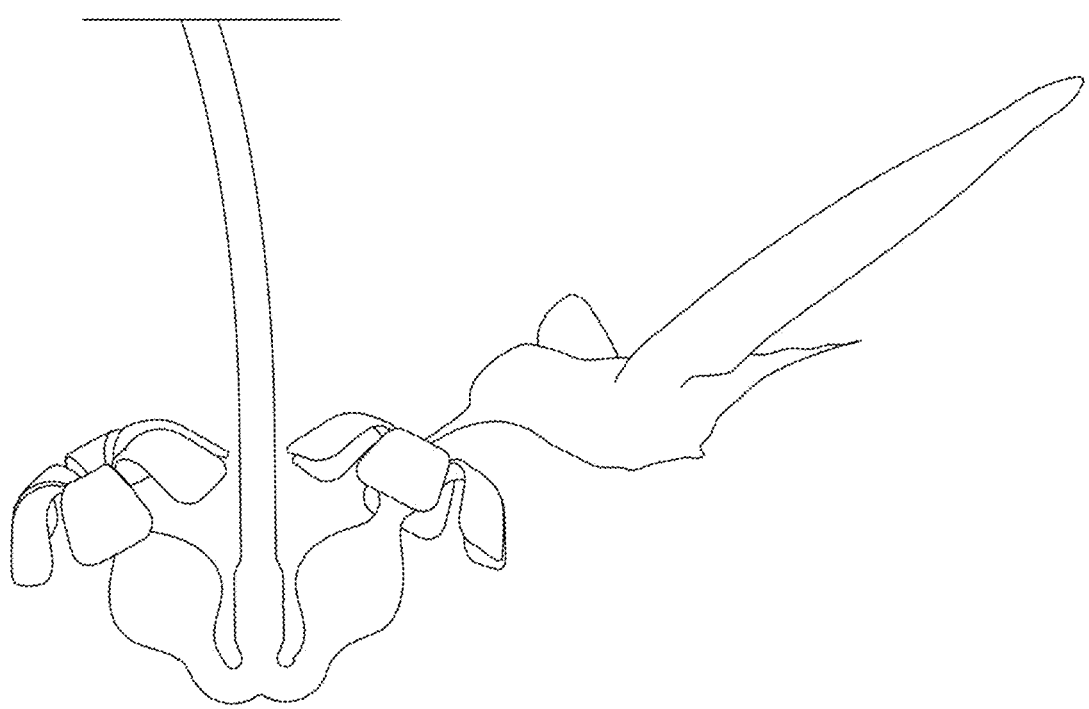
FIG. 6 is a photographing effect diagram of the flower and the bird of an embodiment of the present invention.

As shown in FIG. 1, the present embodiment provides a passive hummingbird water feeder, wherein:

a container 1, a connecting pipe 3 and a water storage bladder 4 are provided; one end of the connecting pipe 3 communicates with the water storage bladder 4, and the other end is arranged inside the container 1; and the maximum water level of the water storage bladder 4 is not higher than that of the container 1; and the water storage bladder 4 is used as a hummingbird sucking mouth.

preferably, a cover plate 2 connected to the container 1 is further provided.

preferably, the water storage bladder 4 is made into the style of a simulated flower, and there may be a plurality of them, only two of which are shown in FIG. 1; the water storage bladder 4 opens upwardly, and the specific inclination angle can be adjusted according to actual needs, and is not limited herein; the opening is provided with a one-way duckbill valve 17 that is normally closed as a hummingbird sucking mouth;

in this embodiment, the cover plate 2 is above the container 1; one end of the connecting pipe 3 is connected to the water storage bladder 4, and the other end passes through the cover plate 2 and is placed inside the container 1; the specific structure of the cover plate provided herein is not limited, as long as it can be sealed with the container 1, the connecting pipe 3, and the water storage bladder 4;

in this embodiment, the duckbill valve 17 opening of the water storage bladder 4 is used to introduce the liquid in the container 1 into the water storage bladder 4 through the delivery pipe 6, based on the siphon principle; hummingbirds can use their beaks to hit open the duckbill valve 17 and suck sugar water; when unused, the opening of the duckbill valve 17 is usually closed to prevent insects such as ants from entering;

as shown in FIG. 2 and FIG. 3, the cover plate 2 is composed of a hollow pipe 7, a closed plate 8, and hollow thin pipes 9; the hollow pipe 7 is provided with an adjustment hole 10, and the hollow thin pipe 9 are plural, which can be used for inserting decorative flower branches 13 and others to attract hummingbirds. The effect is shown in FIG. 4;

it should be noted that the structures of the container 1 and the cover plate 2 in this embodiment does not limit the specific structures thereof in the present application; in actual design, the shapes and structures of the hollow pipe 7, the closed plate 8, and the hollow thin pipe 9 can be adjusted, and the hollow thin pipe 9 can be canceled, increased or reduced according to the actual needs, and the ornaments or other things that being fitted with the hollow thin pipe 9 can be changed at will;

FIG. 4 further comprises a handle 14, which can be used to hang the hummingbird water feeder indoors or outdoors, and the specific hanging place vary as needed; it should be noted that the handle is provided as needed, and may be reduced accordingly if not needed on some hummingbird water feeders; in more implementations, the handle may also be replaced by a hook, serving for hanging in other scenarios;

the connecting pipe 3 comprises an air cavity pipe 5 and a delivery pipe 6; the air cavity pipe 5 is provided with an air hole 11; one end of the air cavity pipe 5 is placed inside the container 1, and the outer wall of the other end is closely matched with the inner wall of the hollow pipe 7 and penetrates the cover plate 2; and one end of the delivery pipe 6 passes through the air cavity pipe 5 and is located inside the container 1, and is slightly lower than the horizontal position of the air cavity pipe 5; the other end extends and droops after being closely fitted with the air cavity pipe 5, and communicates with the water storage bladder 4, and the water storage bladder can be rotatably connected to the end of the delivery pipe;

the opening and closing of the air hole 11 can be controlled by changing the relative positions of the adjustment hole 10 and the air hole 11; when the air hole 11 is not within the range of the adjustment hole 10, the air hole is closed; and when the hummingbird water feeder is in normal use, the air hole 11 is within the range of the adjustment hole 10, and the relative positions can be adjusted;

specifically, since the upper end of the air cavity pipe 5 is closely fitted with the delivery pipe 6, when it is necessary to adjust the position of the air hole 11, it can be realized by rotating the delivery pipe 6 to drive the air cavity pipe 5; when it is necessary to open the air hole 11, the delivery pipe 6 can be rotated to adjust the air hole 11 within the range of the adjustment hole 10, so as to realize the direction adjustment of the water storage bladder 4; when it is necessary to close the air hole 11, the air hole 11 is rotated out of the range of the adjustment hole 10 by rotating the delivery pipe 6; and the air cavity pipe 5 and the delivery pipe 6 may be integrated, or they may be installed as separate parts and closely fitted;

specifically, in addition to the above technical proposal that the upper end of the air cavity pipe 5 is closely fitted with the delivery pipe 6, the air cavity pipe 5 and the delivery pipe 6 may also be closely rotated and rotatable with each other on the basis of a sealed fit; the delivery pipe 6 can rotate to any direction at will, and the opening and closing of the air hole 11 may be controlled by a plug;

when the liquid is introduced into the water storage bladder 4, since the air cavity pipe 5 is filled with air, the final water level of the water storage bladder 4 is the same as the lowest water level in the container 1, that is, consistent with the horizontal position of the lower end of the air cavity pipe 5, forming a constant liquid level as shown in FIG. 2 and the liquid level is constantly maintained;

in this embodiment, the quantity of the delivery pipe 6 can also be set according to actual needs, and is not limited to only one piece; for example, two, four, or even more delivery pipes 6 may be installed in a circle around the container 1; it should be noted that one or more water storage bladders 4 may be communicated to one or more delivery pipes 6; and the use of a plurality of water storage bladders 4 to introduce and dispense the sugar water in the container 1 can avoid the contamination of sugar water in container 1; if a hummingbird carries virus, only the water storage bladder 4 consumed by the bird will be contaminated, without affecting the sugar water quality in other water storage bladders 4 and the container 1;

the delivery pipe 6 may be used to rotate the connecting pipe 3, so as to adjust the direction of the water storage bladder 4; and the water storage bladder 4 can also rotate around the delivery pipe 6 to adjust the flower angle;

as shown in FIG. 5, an installation position of the photographing device 12, the position is located in the lower cavity 15 of below the container 1, and the camera is installed on the outer wall of the container 1 facing the water storage bladder 4, so that the hummingbirds and the simulated flower can be photographed directly, and only the flower and the bird can be captured; when the hummingbird water feeder is placed outdoors, the background of the captured image is clean, without other mechanisms of the feeder other than the water storage bladder 4 and partial delivery pipe 6; and the delivery pipe 6 simulates the flower branch of real flowers, while the water storage bladder 4 simulates the real flower; against the background of nature, the simulated scenario of the hummingbird sucking nectar is realized for photographing, facilitating user appreciation and study purposes; the photographing effect is shown in FIG. 6; FIG. 6 shows the photographing effect of a first-person perspective at aspect ratio 16:9, a horizontal visual field of 110°, 80 mm foreground focal length, with the flower branch rotated to the left by 10°;

it should be noted that the specific photographing scenarios may be hummingbirds sucking sugar water, or a plurality of hummingbirds queuing up near the water storage bladder 4 to suck sugar water, or hummingbirds having fun near the water storage bladder 4, etc., and the photographing effect is not limited to that shown in FIG. 6; simulated flowers and hummingbirds in various proportions in the image can be realized by rotating the connecting pipe 3; and the water storage bladder 4 may also self-rotate to realize the photographing effect of simulated flowers and hummingbirds at different angles;

specifically, the photographing device 12 may be installed in such a manner that, if 360° photographing is realized on the outer wall or bottom of the container 1, flowers and birds captured at varied proportions can be achieved without turning the connecting pipe, and a plurality of delivery pipes 6 may be combined to attract more hummingbirds to suck sugar water, thereby improving the photographing efficiency;

the container 1 is provided with a sucrose dosing device for controlling the proportions of sugar and water, and suitable sugar water can be proportioned according to the hummingbird species; the sucrose dosing device may be a part of the container 1, or may be a related device separately mounted on the container 1, and is not limited herein;

specifically, the sucrose dosing device comprises a first chamber used for filling sucrose, and a second chamber used for filling water; after identifying the hummingbird species about to suck the sugar water, the sugar water is prepared with a proper proportion of sugar and water, which can better meet the dietary needs of the birds, and win more opportunities for photographing and capturing more behavior characteristics of hummingbirds;

a sensor is provided on the container 1 for detecting the water level of the container 1; the sensor may be of capacitive type/electrode type, etc., and is installed above the constant liquid level; the specific installation method, water level detection method, and user prompting method are not limited herein;

specifically, when the user fills the container 1 with water, if the sensor detects that the highest water level in the container 1 has reached the preset water upper limit, an alarm is issued to remind the user that the liquid level is excessive and overflow is about to happen;

specifically, when the hummingbird water feeder is in normal use, and the sensor detects that the highest water level in the container 1 has reached the preset water lower limit, an alarm is issued to remind the user to add more liquid.

In this embodiment, by providing the air cavity pipe 5, the delivery pipe 6, and the water storage bladder 4, based on the siphon principle, the water can be introduced from the container 1 into the water storage bladder 4 without power and the water level can be constantly maintained, realizing water filling from the above container 1 directly. Apart from the delivery pipe 6 as a siphon, there is no other structure or device around the water storage bladder 4, nor a place for the hummingbird to stand, so that the hummingbird have to hover for a longer period of time, which is more realistic in terms of the nectar sucking effect of hummingbirds simulated. As a result, the more realistic foraging habits of hummingbird can be photographed, and images of simulated flowers and hummingbirds photographed at different angles and different proportions can be obtained. The present invention is simpler and more convenient than the prior art using inverted water containers, and provides a better effect of simulating hummingbird sucking nectar, without destroying the normal living habit of hummingbirds hovering in midair for foraging.

Embodiment 2

The present embodiment provides a feeding method of the passive hummingbird water feeder of embodiment 1, as shown in FIG. 7, wherein:

in storing water, the connecting pipe 3 connects with the container 1 and the water storage bladder 4 to store sugar water; and the container 1 and the water storage bladder 4 form a siphon to maintain the water level in the water storage bladder 4 unchanged;

in accessing water, the hummingbird hits open the water storage bladder 4 to suck the sugar water; and under the siphon action, the sugar water is introduced into the water storage bladder 4 from the container 1 through the connecting pipe 3, so that the water level of the water storage bladder 4 remains unchanged and the supply of sugar water is guaranteed;

when replenishing sugar water into the container 1, the upper part of the container 1 is opened for filling; after replenishing, add the sealing cover plate 2 and the connecting pipe 3, the air hole 11 closes, and the water storage bladder 4 communicates with the connecting pipe 3, and the sugar water in the container 1 is introduced into the water storage bladder 4 by repeatedly squeezing the water storage bladder 4;

preferably, the delivery pipe 6 can be rotated to drive the rotation of the connecting pipe 3, so as to realize the opening and closing of the air hole 11;

preferably, a sensing device 16 is set to detect the water level and may issue an alarm to the user when the water level is about to reach a set maximum or minimum value.

Based on the above technical proposal, in the present embodiment, the process of feeding hummingbirds by the hummingbird water feeder is as follows:

when used for the first time, open the cover plate 2, take out the connecting pipe 3, and pour water into the container 1; then close the cover plate 2, and insert the connecting pipe 3 into the cover plate 2, so that the cover plate 2, the container 1, the connecting pipe 3, and the water storage bladder 4 form an airtight space, and the connecting pipe 3, the air cavity pipe 5 and the delivery pipe 6 are filled with air, and the lowest water level in the container 1 is on the horizontal surface of the bottom of the connecting pipe 3, that is, at the liquid level A in FIG. 2;

squeeze the water storage bladder 4, and based on the siphon principle, the liquid in the container 1 enters the water storage bladder 4 through the delivery pipe 6 as a siphon; the water level of the water storage bladder 4 is flush with the lowest water level A of the container 1;

when the water level of the water storage bladder 4 and the lowest water level of the container 1 are flush with the liquid level A, the air cavity pipe 5 is filled with air, and the delivery pipe 6 is filled with sugar water; open the air hole 11 to enable the air cavity pipe 5 to communicating with the atmosphere, and a gas-liquid equilibrium surface is formed on the A surface, which is a constant liquid level; the water level of the water storage bladder 4 and the lowest water level of the container 1 is constantly maintained at the liquid level A;

specifically, once a constant liquid level A is formed, if a hummingbird comes to suck the sugar water, it can open the duckbill valve 17 of the water storage bladder 4 for sucking, during which, the liquid in the container 1 decreases and air is replenished from the air cavity pipe 5, indicated by small bubbles appearing in the liquid at the liquid level A, and the highest water level in the container 1 drops as the hummingbird sucks.

In the present embodiment, the present invention overcomes the drawbacks of the prior art that requires water filling from the container bottom and the insertion of feeding tray. The present invention allows water to be filled in directly from above the container, and sugar water supply from the water storage bladder is realized based on siphon principle without power. As a result, it is more convenient to add sugar water into the hummingbird water feeder, and avoids water leakage and other problems due to inverted devices.

While particular embodiments of the present invention have been described in detail above, it should be understood that various other adaptations and/or modifications of the present invention can be made by those skilled in the art without departing from either the spirit of the invention or the scope of the appended claims.

What is claimed is:

1. A passive hummingbird water feeder, comprising:
   a container (1),
   a cover plate (2) connected to the container (1),
   a connecting pipe (3) and
   a water storage bladder (4); wherein one end of the connecting pipe (3) communicates with the water storage bladder (4), and an other end of the connecting pipe (3) is arranged inside the container (1); and a maximum water level of the water storage bladder (4) relative to a ground level is not higher than a maximum water level of the container (1) relative to the ground level, and the water storage bladder (4) is configured to feed water to a hummingbird;
   wherein the connecting pipe (3) comprises an air cavity pipe (5) and a delivery pipe (6); the air cavity pipe (5) is provided with an air hole (11); one end of the air cavity pipe (5) is located inside the container (1), and an other end of the air cavity pipe (5) passes through the cover plate (2) and is sealed and fitted with the cover plate (2);
   wherein one end of the delivery pipe (6) is sleeved in the air cavity pipe (5) and is located inside the container (1), and an other end of the delivery pipe (6) is sealed and fitted above the air cavity pipe (5) and protrudes and droops to communicate with the water storage bladder (4); and a water level of the water storage bladder (4) is the same as a lowest water level of the container (1).

2. The passive hummingbird water feeder of claim 1, further comprising a sensing device configured to detect and adjust a water level of the container (1).

3. The passive hummingbird water feeder of claim 2, further comprising a lower cavity, wherein the sensing device is provided in the lower cavity.

4. The passive hummingbird water feeder of claim 1, further comprising a photographing device (12) for recognizing the hummingbird and automatically adjusting the shooting angle and shooting parameters to photograph and record hummingbirds.

5. The passive hummingbird water feeder of claim 4, further comprising a lower cavity, wherein the photographing device is provided in the lower cavity.

6. The passive hummingbird water feeder of claim 1, further comprising a lower cavity, a lower portion of the container is inserted into the lower cavity.

7. The passive hummingbird water feeder of claim 6, wherein the lower cavity and the container are integrally formed.

8. The passive hummingbird water feeder of claim 1, wherein the delivery pipe is a siphon.

9. The passive hummingbird water feeder of claim 1, wherein the water storage bladder is provided with a one-way duckbill valve.

10. A passive hummingbird water feeder, comprising:
    a container (1),
    a cover plate (2) connected to the container (1),
    a connecting pipe (3) and
    a water storage bladder (4); wherein one end of the connecting pipe (3) communicates with the water storage bladder (4), and an other end of the connecting pipe (3) is arranged inside the container (1); and a maximum water level of the water storage bladder (4) relative to a ground level is not higher than a maximum water level of the container (1) relative to the ground level, and the water storage bladder (4) is configured to feed water to a hummingbird;
    wherein the connecting pipe (3) comprises an air cavity pipe (5) and a delivery pipe (6); the air cavity pipe (5) is provided with an air hole (11); one end of the air cavity pipe (5) is located inside the container (1), and an other end of the air cavity pipe (5) passes through the cover plate (2) and is sealed and fitted with the cover plate (2);
    wherein the cover plate (2) is provided with an adjustment hole (10), and opening and closing of the air hole (11) are controlled by changing the relative positions of the air hole (11) and the adjustment hole (10).

* * * * *